United States Patent
Kato et al.

(10) Patent No.: US 9,767,844 B1
(45) Date of Patent: Sep. 19, 2017

(54) INFORMATION RECORDING METHOD AND INFORMATION RECORDING APPARATUS INCLUDING SWITCHING OF RECORDING LAYER IN SHORTAGE OF FREE SPACE

(71) Applicant: Panasonic Intellectual Property Management Co., Ltd., Osaka (JP)

(72) Inventors: Hisae Kato, Osaka (JP); Yoshikazu Yamamoto, Osaka (JP); Motoshi Ito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/356,847

(22) Filed: Nov. 21, 2016

(30) Foreign Application Priority Data

Mar. 25, 2016 (JP) .................................. 2016-061051

(51) Int. Cl.
G11B 20/18 (2006.01)
G11B 20/12 (2006.01)

(52) U.S. Cl.
CPC ...... *G11B 20/1889* (2013.01); *G11B 20/1217* (2013.01); *G11B 2020/1241* (2013.01)

(58) Field of Classification Search
CPC ........ G11B 2007/0013; G11B 7/24038; G11B 7/24; G11B 2220/20; G11B 2220/2537; G11B 7/26; G11B 7/2542; G11B 7/00745; G11B 27/3027; G11B 19/12; G11B 2007/0006; G11B 27/329
USPC ....... 369/275.1, 275.2, 93, 94, 47.27, 53.22, 369/53.24, 53.1
See application file for complete search history.

(56) References Cited

U.S. PATENT DOCUMENTS

| | | | |
|---|---|---|---|
| 5,508,995 A | 4/1996 | Moriya et al. | |
| 8,363,531 B2 | 1/2013 | Akimoto et al. | |
| 8,850,111 B2 * | 9/2014 | Hwang | G11B 20/1883 711/112 |
| 2011/0194393 A1 | 8/2011 | Akimoto et al. | |

FOREIGN PATENT DOCUMENTS

| | | |
|---|---|---|
| JP | 07-029185 A | 1/1995 |
| JP | 2011-014203 A | 1/2011 |

* cited by examiner

*Primary Examiner* — Nabil Hindi
(74) *Attorney, Agent, or Firm* — Renner Otto Boisselle & Sklar, LLP

(57) ABSTRACT

An information recording method of recording information is provided in an information recording medium having a plurality of recording layers including a first recording layer and a second recording layer located to be closer to a surface than the first recording layer, each of the plurality of recording layers includes a user data area for recording user data, a spare area for alternatively recording data of failed recording into the user data area, and a management information area for recording management information. The first recording layer is used as a recording object layer at start of recording. When any one of the user data area, the spare area, and the management information area of the first recording layer runs short of a free space, then the recording object layer of the user data area, the spare area, and the management information area is switched over to the second recording layer.

8 Claims, 15 Drawing Sheets

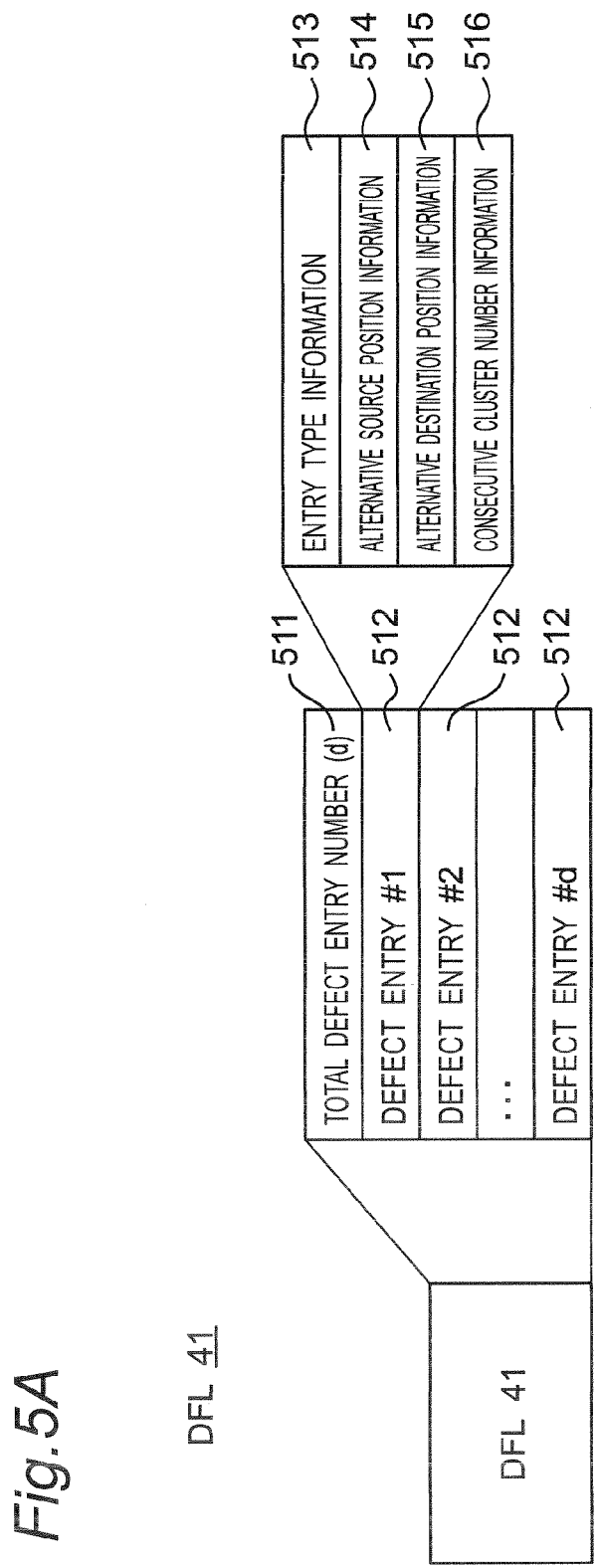

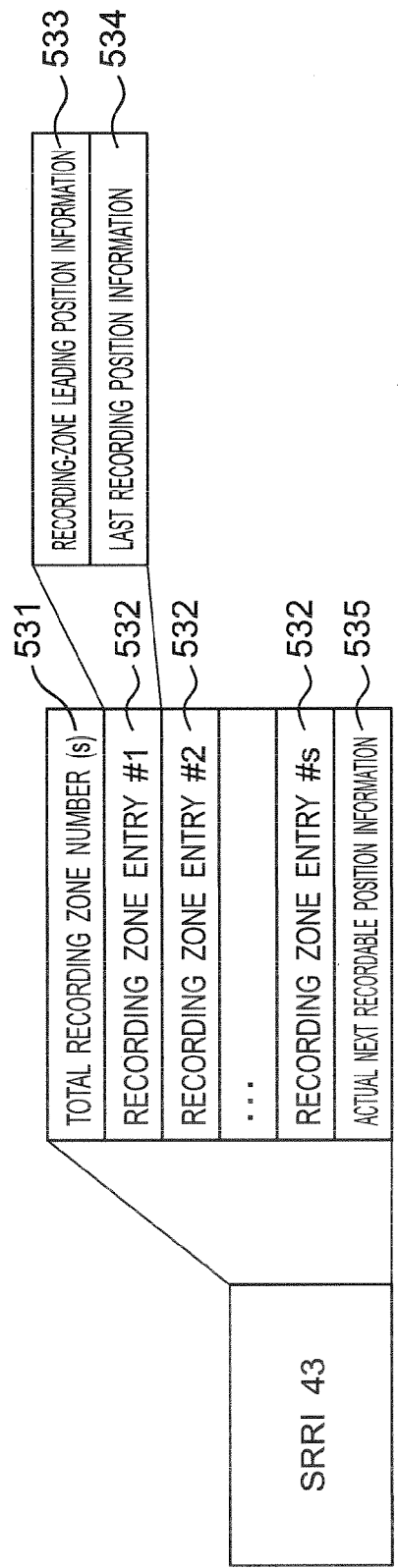

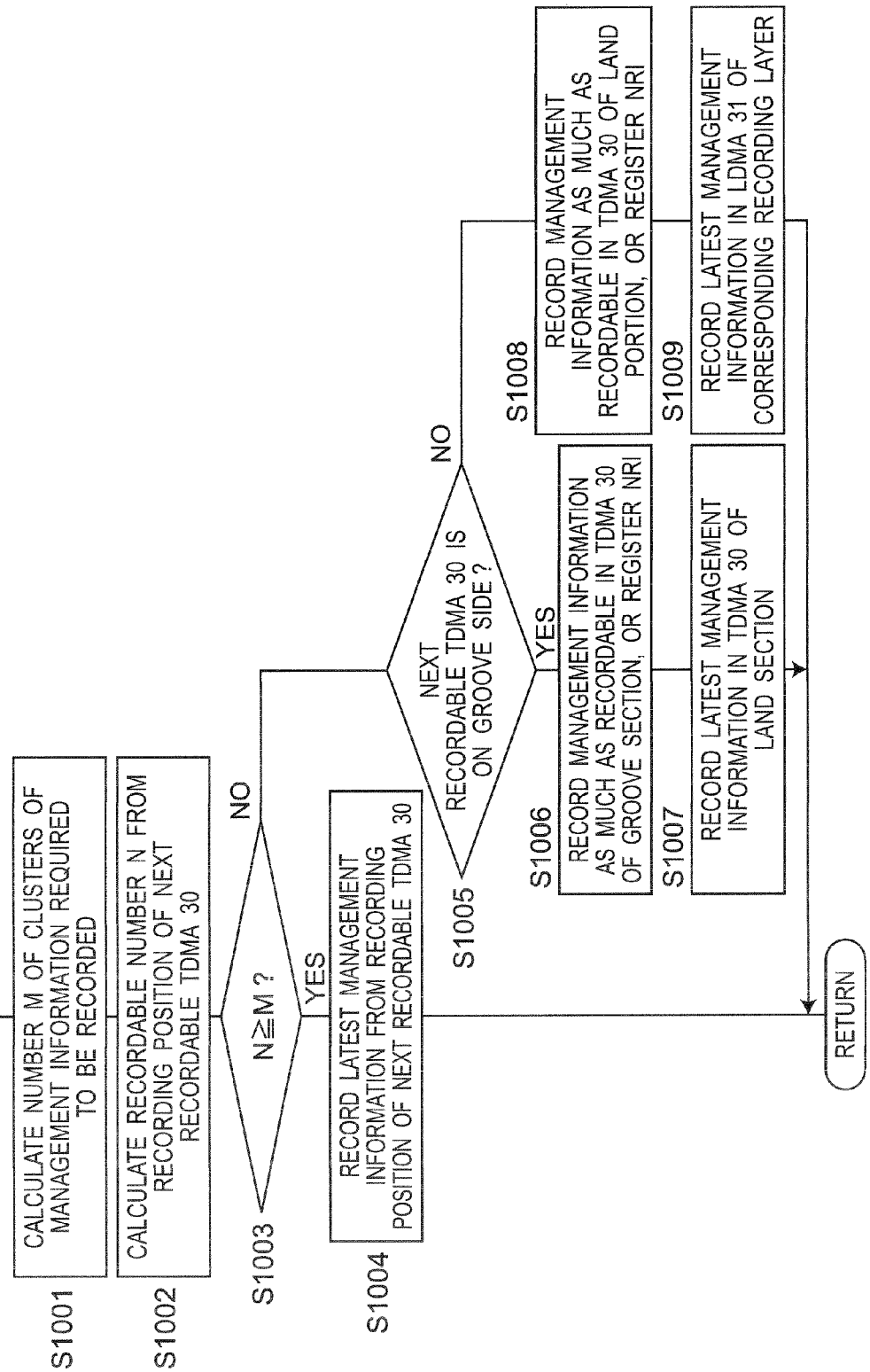

INFORMATION RECORDING METHOD AND INFORMATION RECORDING APPARATUS INCLUDING SWITCHING OF RECORDING LAYER IN SHORTAGE OF FREE SPACE

CROSS-REFERENCE TO RELATED APPLICATION

This is an application, which claims priority to Japanese patent application No. JP 2016-061051 as filed on Mar. 25, 2016, the contents of which are incorporated herein by reference.

BACKGROUND OF THE DISCLOSURE

1. Field of the Disclosure

The present disclosure relates to an information recording method for recording data on an optical disc.

2. Description of the Related Art

Information recording mediums for recording data include optical discs such as a DVD and a Blu-ray (registered trademark) disc (hereinafter referred to as a BD). The optical discs are recently attracting attention as information recording mediums used for archival purposes because of high long-term storage reliability of the optical discs, the ability to reduce power consumption at the time of storage, etc.

In order to use for archival purposes, it is considered that larger-capacity optical discs are required. The methods of achieving a larger capacity of an optical disc include a method of recording data on both tracks located on a land and a groove, a method of narrowing a track pitch, a method of stacking a plurality of recording layers to form a multi-layer, etc. The method of recording data onto both tracks on a land and a groove is used in DVDRAMs, and improves a recoding density by recoding data on both the land and the groove (See Patent Document 1, for example). The method of narrowing a track pitch is used in BDs, in which the track pitch is made narrower than DVDs to achieve a five-fold or more increase in recording capacity. The method of stacking a plurality of recording layers to form a multi-layer is used in BDXL, which includes up to four layers.

In the case where a plurality of recording layers is stacked and multi-layered, recording and reproduction of a certain recording layer are affected by another recording layer. For example, a transmittance or a reflectance of light may be changed due to a recording state of another recording layer, and light may not be irradiated with an appropriate amount to an intended recording layer. In such a case, in order to avoid an influence of change in transmittance due to a recording state of another recording layer, the recording layers must be arranged at a distance of approximately 200 μm or more in consideration of a lamination error etc. of the recording layers in a manner similar to that of the case of the OPC (Optimum Power Control) area of BDXL (See Patent Document 2, for example).

PRIOR ART DOCUMENTS

Patent Documents

Patent Document 1: Japanese Laid-Open Patent Publication No. JPH 07-029185 A
Patent Document 2: Japanese Laid-Open Patent Publication No. JP 2011-014203 A The above-mentioned conventional techniques cannot ensure a large data area when data is recorded on an optical disc.

SUMMARY OF THE DISCLOSURE

Non-limiting and exemplary embodiment provides an information recording method capable of ensuring a larger data area when data is recorded on an optical disc.

According to one aspect of the present disclosure, there is provided an information recording method of recording information in an information recording medium having a plurality of recording layers including a first recording layer and a second recording layer located to be closer to a surface of the information recording medium than the first recording layer. Each of the plurality of recording layers includes a user data area for recording user data, a spare area for alternatively recording data of failed recording into the user data area, and a management information area for recording management information. The first recording layer is used as a recording object layer at start of recording. When any one of the user data area, the spare area, and the management information area of the first recording layer runs short of a free space, then the recording object layer of the user data area, the spare area, and the management information area is switched over to the second recording layer.

According to the information recording medium of the present disclosure, the information recording medium can ensure a larger data area when data is recorded on an optical disc.

BRIEF DESCRIPTION OF THE DRAWINGS

FIG. 5A is a format diagram of a data structure of a DFL 41 of FIG. 4.

FIG. 5C is a format diagram of a data structure of an SRRI 43 of FIG. 4.

FIG. 10 is a flowchart of a management information recording process (S709) of recording the latest information into the DMA 21 of FIG. 2, which is a subroutine of FIG. 7.

DETAILED DESCRIPTION OF THE EMBODIMENTS

Figure 1:
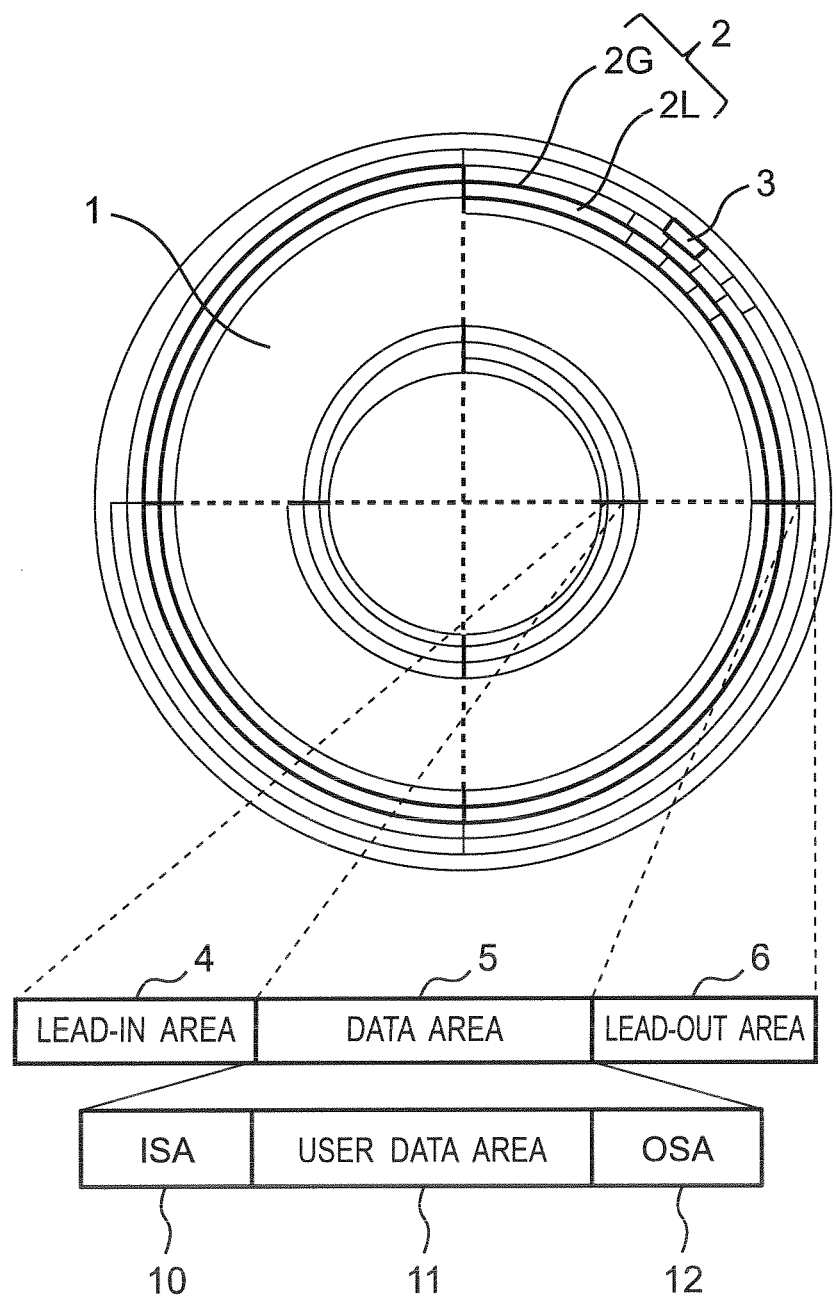
FIG. 1 is a plane view and a format diagram for explaining an entire configuration of an optical disc 1 according to an embodiment.

Non-limiting and exemplary embodiments will now be described in detail with reference to the drawings as needed. It is noted that detailed description will not be provided more than necessary one in some cases. For example, detailed description of already well-known facts and repeated description of substantially the same constituent components may not be provided. This is for the purpose of avoiding unnecessary redundancy of the following description and facilitating understanding by those skilled in the art.

The accompanying drawings and the following description are provided for sufficient understanding of the present disclosure by those skilled in the art, and it is not intended to limit the subject matter described in claims thereto.

Development Leading to Embodiments of the Disclosure

In the case where each track pitch is further narrowed with data recorded on both a land and a groove and a plurality of recording layers are stacked and multi-layered so as to achieve a larger capacity of an optical disc, an influence of transmittance change due to a recording state of another recording layer appears more prominently. As a result, the light cannot be irradiated with an appropriate amount to an intended recording layer, and it becomes extremely difficult to record data with a recording quality ensured such that storage reliability can be guaranteed. Therefore, in order to avoid an influence of another recording layer, data is recoded from a recording layer located on the deepest side from a surface of an optical disc.

An optical disc has a user data area as well as a management information area, a spare area, etc. Recording in these areas is performed by considering areas of all the recording layers as one area, resulting in different timings of movement between recording layers. In particular, although the recording in the user data area is performed in a recording layer L1, the recording in the spare area may be performed in a recording layer L0. In this case, at the time of recording in the spare area of the recording layer L0, a transmittance change occurs due to a recording state of the user data area of the recording layer L1, and may make it unable to perform recording in the spare area of the recording layer L0. In order to solve this problem, the adjacent areas such as the spare area and the user data area are arranged at a distance of approximately 200 μm. However, an area of approximately 200 μm between the spare area and the user data area must be kept in a non-recorded state, and therefore, ends up as a wasted area. The spare area and the management information area are also adjacent to each other, and a spare area also exits in the outer circumference. Therefore, the areas must be arranged at an interval of approximately 200 μm also on the outer circumferential side, and a large user data area cannot be ensured.

The present disclosure solves these problems, and provides an information recording method and an information recording apparatus capable of ensuring a larger data area on an optical disc when data is recorded on the optical disc.

Non-Limiting and Exemplary Embodiment

The information recording method and the information recording apparatus of the non-limiting and exemplary embodiment will hereinafter be described with reference to the drawings. The same constituent components are denoted by the same reference numerals, and will not repeatedly be described. In the present embodiment, a write-once optical disc including three recording layers will be described as an example of an information recording medium. However, this is merely an example and a recording layer with two or more recording layers can produce the same effect.

(1) Configuration of Optical Disc

FIG. 1 is a plane view and a format diagram for explaining a general configuration of an optical disc 1 according to the present embodiment. Referring to FIG. 1, a disc-shaped optical disc 1 includes, for example, three recording layers L0, L1 and L2 (FIGS. 2 and 3) for recording data (information). Each of the recording layers L0, L1 and L2 has a plurality of tracks 2 formed into a spiral shape. Each of the tracks 2 is configured to include a groove track 2G and a land track 2L adjacent to each other. The tracks 2 are provided with a multiplicity of finely divided sectors 3. A track pitch is a width of each of the tracks 2, and is 0.225 μm.

The areas of the optical disc 1 are roughly classified into a lead-in area (inner zone) 4, a data area 5, and a lead-out area (outer zone) 6. The data area 5 is configured to include a user data area 11 in which user data is recorded, and an ISA (Inner Spare Area) 10 and an OSA (Outer Spare Area) 12 that are spare areas used for alternatively recording data supposed to be recorded in a defective sector detected in the user data area 11. The ISA 10 is the spare area on the inner circumferential side than the user data area 11. The OSA 12 is the spare area on the outer circumferential side than the user data area 11. The ISA 10 and the OSA 12 may collectively simply be referred to as a spare area.

The lead-in area 4 and the lead-out area 6 act as margins when an optical pickup of an information recording and producing apparatus described later accesses an end portion of the data area 5, so that the tracks can be followed even when the optical pickup overruns, and plays a role of a so-called overlap width. The lead-in area 4 includes an area for recording management information necessary for recording and reproducing on the optical disc 1 and an OPC area (Optimum Power Control Area) for test recording of predetermined test data for obtaining an optimum recording condition etc.

Each of the sectors 3 has a physical sector number (PSN) assigned for identification of the sector. Additionally, each of the sectors 3 in the data area 5 has a consecutive logical sector number (LSN) starting from zero assigned for allowing a higher-level apparatus (not shown) such as a host computer to recognize the sector. The physical sector number and the logical sector number are hereinafter also referred to as a physical address and a logical address, respectively.

(2) Configurations of Areas of Optical Disc

Figure 2:
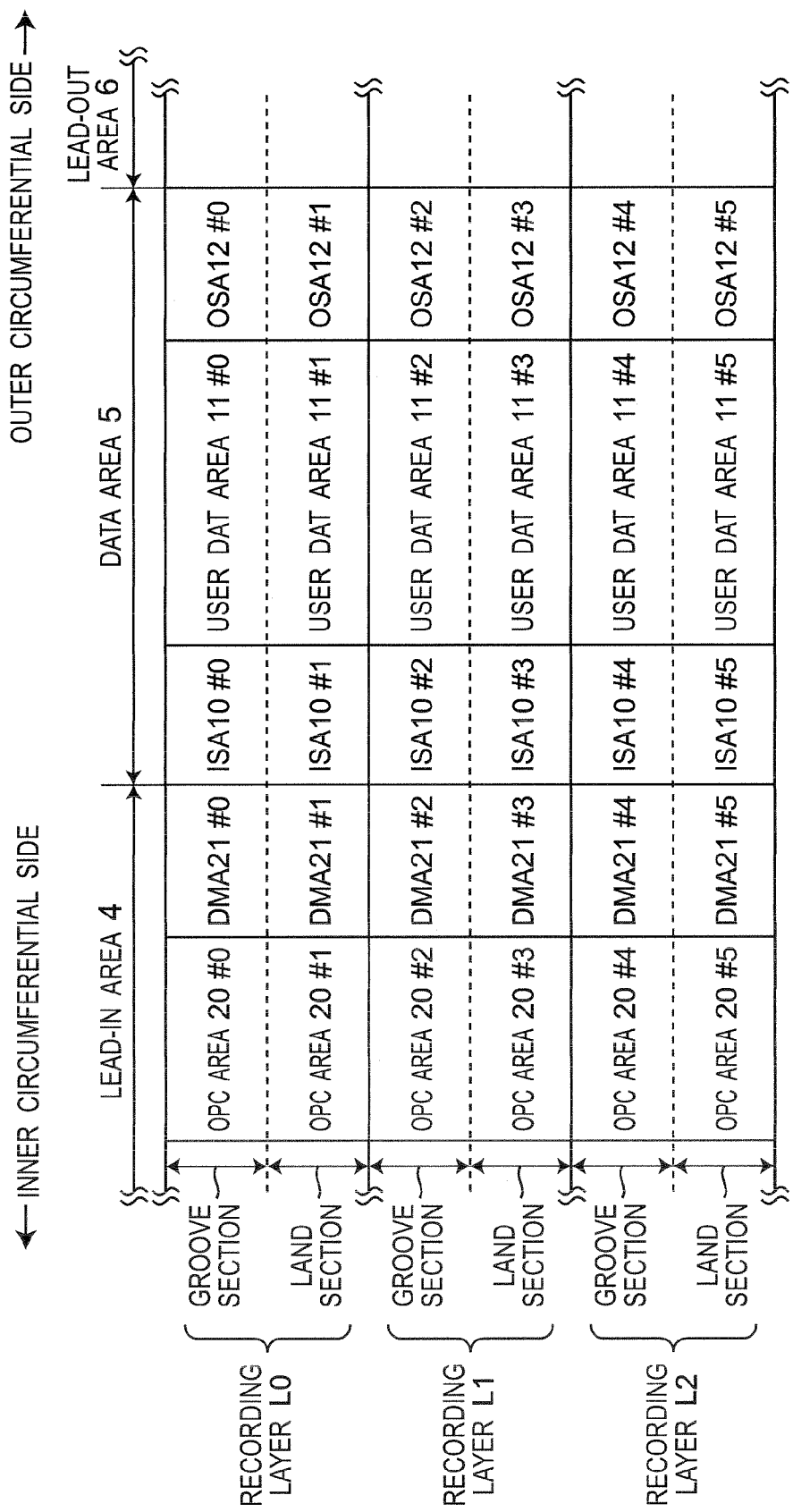
FIG. 2 is a format diagram of arrangement of areas in all the recording layers as well as lands and grooves of the optical disc 1 of FIG. 1.

FIG. 2 is a format diagram of arrangement of areas in the land tracks 2L and the groove tracks 2G of all the recording layers of the optical disc 1 of FIG. 1. The values described by using # in FIG. 2 are serial numbers.

Referring to FIG. 2, the optical disc 1 includes three recording layers L0, L1 and L2. The optical disc 1 has a recording layer L0 located on the deepest side when viewed from a surface (onto which a laser beam is incident) of the optical disc 1, a recording layer L1 located to be closer to the surface of the optical disc 1 than the recording layer L0, and a recording layer L2 located to be closer to the surface of the optical disc 1 than the recording layer L1.

The lead-in area 4 is the area located on the inner circumferential side of the recording layer. The lead-in area 4 includes the OPC areas 20 for adjusting a recording power and a write strategy signal as well as the DMAs (Disc Management Areas) 21 for recording management information indicative of a recording state etc. of the optical disc 1.

The data area 5 includes the user data areas 11 in which user data are recorded as well as the ISAs 10 and the OSAs 12 used for alternatively recording data supposed to be recorded in a defective sector detected in the user data areas 11.

The OPC areas 20, the DMAs 21, the ISAs 10, the user data areas 11, and the OSAs 12 are respectively arranged at the same radial positions of the groove sections and the land sections of all the recording layers.

The areas are arranged at adjacent positions between the OPC areas 20 and the DMAs 21, between the DMAs 21 and the ISAs 10, between the ISAs 10 and the user data areas 11, and between the user data areas 11 and the OSAs 12.

In the OPC areas 20, the DMAs 21, the ISAs 10, the user data areas 11, and the OSAs 12, the recording is started in each of the areas from the recording layer L0 on the deepest side from the surface of the optical disc 1 so as to avoid an influence of the transmittance change due to a recording state of another recording layer, and the recording layer L1 and the recording layer L2 are used in this order toward the side to be closer to the surface of the optical disc 1. In the case where the groove sections and the land sections are taken into account, predetermined data are recorded in the order of the groove section of the recording layer L0, the land section of the recording layer L0, the groove section of the recording layer L1, the land section of the recording layer L1, the groove section of the recording layer L2, and the land section of the recording layer L2.

Figure 3:
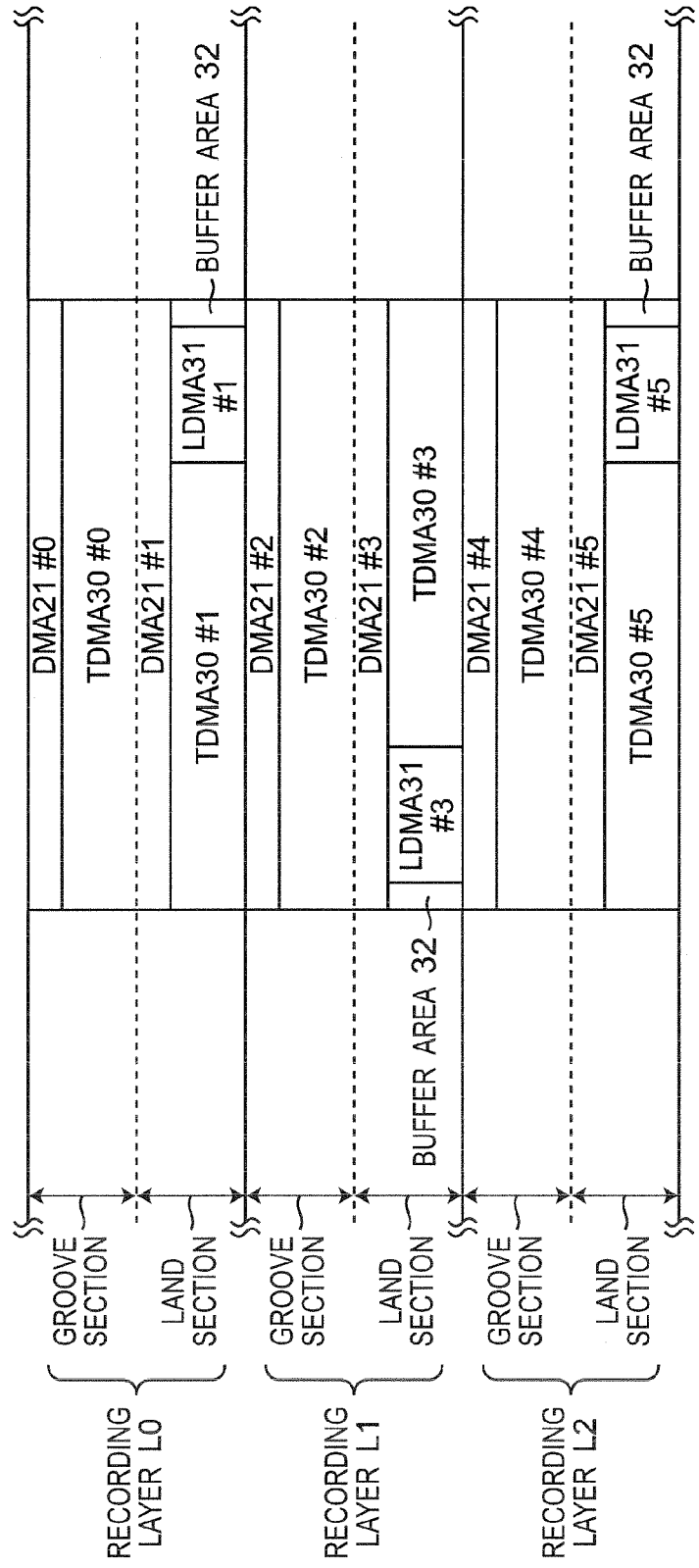
FIG. 3 is a format diagram of an example of a detailed area configuration of DMAs 21 of FIG. 2.

FIG. 3 is a format diagram of an example of a detailed area configuration of the DMAs 21 in the optical disc 1 of FIG. 1.

Referring to FIG. 3, the DMAs 21 are made up of TDMAs (Temporary Disc Management Areas) 30 and LDMAs (Layer-latest Disc Management Areas) 31.

The TDMAs 30 are areas for transiently recording the management information. On the write-once optical disc 1, the once recorded management information cannot be overwritten and updated. Therefore, when the management information is updated, management information is newly recorded from a next recordable position of the TDMAs 30 to update the management information.

The LDMAs 31 are areas for recording all the latest management information in the recording layers thereof. In the case where the management information is recorded in one of the LDMAs 31, this means that all the TDMAs 30 arranged on the same recording layer as the LDMA 31 are completely used. For example, in the case where the management information is recorded in an LDMA 31#1 of the recording layer L0, this means that a TDMA 30#0 and a TDMA 30#1 of the recording layer L0 are completely used. When the TDMAs 30 are completely used, for example, in the case of the recording layer L0, all the areas of the TDMA 30#0 and the TDMA 30#1 are used so that data can no longer be recorded. Otherwise, although an unused area remains, the TDMA 30#0 and the TDMA 30#1 are no longer used.

A buffer area 32 is an area in which data must not be recorded. The buffer area 32 is a buffer area kept in a non-recorded state. The size of the buffer area 32 may be a size equal to or greater than that of the track on which the buffer area 32 is located.

Figure 4:
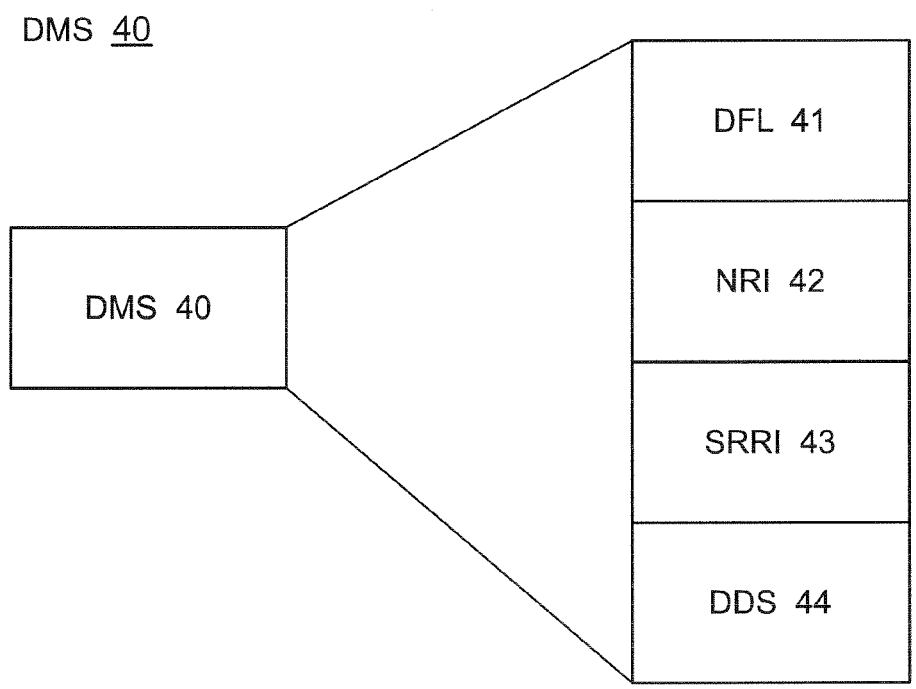
FIG. 4 is a format diagram of a data structure of a disc management structure (DMS) recorded in the DMAs 21 of FIG. 2.

FIG. 4 is a format diagram of a data structure of a disc management structure (DMS) 40 recorded in the DMAs 21 of the optical disc 1 of FIG. 1.

Referring to FIG. 4, the DMS 40 is management information and is configured to include a defect list (DFL) 41, non-recorded range information (NRI) 42, sequential recording range information (SRRI) 43, and a disc definition structure (DDS) 44.

FIGS. 5A to 5D are format diagrams of detailed data structures of the DMS 40 of FIG. 4 on the optical disc 1 of FIG. 1.

FIG. 5A is a format diagram of a data structure of the DFL 41 of FIG. 4. Referring to FIG. 5A, the DFL 41 includes defect entries 512 that are information on detection of defects on the optical disc 1 and an alternative cluster receiving an overwrite request according to a pseudo overwrite (POW) instruction, and a total defect entry number 511 that is the number of the defect entries 512.

The DFL 41 has a total of d (where d is an integer equal to or greater than zero) defect entries from #1 to #d of the defect entries 512. In the case where neither a defective cluster nor an alternative cluster exists, the DFL 41 has the total defect entry number 511 of zero and the defect entry 512 does not exist.

A cluster in this case is a minimum unit of a recording and reproducing operation performed for the optical disc 1, and an error correction is also performed on the basis thereof. In the present embodiment, in a manner similar to that of the case with BDs, 1 cluster is configured to include 32 sectors 3, and 1 cluster has the size of 64 KB (kilobytes).

Each of the defect entries 512 is configured to include entry type information 513, alternative source position information 514, alternative destination position information 515, and consecutive cluster number information 516.

For the alternative source position information 514, a first physical sector number of a cluster with a defect having occurred or a cluster receiving a pseudo overwrite request is stored.

For the alternative destination position information 515, a first physical sector number of an alternatively recording cluster is stored.

For the consecutive cluster number information 516, in the case where defects have occurred in consecutive clusters or the pseudo overwrite requests are made for consecutive clusters, information indicative of the consecutive cluster number is stored. Specifically, in the case where the clusters are not consecutive, zero is stored as the consecutive cluster number information 516. In the case where the clusters are consecutive, a value of (the consecutive cluster number−1) is stored as the consecutive cluster number information 516.

The entry type information 513 is identification information indicative of whether or not a cluster indicated by the alternative source position information 514 is a non-recorded defective cluster including a non-recorded portion.

The POW in this case means that when a recording request is made to a recorded area on a write-once optical disc capable of recording only once, the data thereof is alternatively recorded in the user data area 11 or the ISA 10 and the OSA 12 as if the recorded area is overwritten.

Specifically, the alternative source position information 514 is stored as a first physical sector number of a cluster to which a recoding request is made, and the alternative destination position information 515 is stored as a first physical sector number of a cluster, in which the alternative recording is performed in the user data area 11 or the ISA 10 and the OSA 12. In the case where the recording request is made for one cluster, zero is stored as the consecutive cluster number information 516, for example, in the case of five clusters, then four is stored as the consecutive cluster number information 516. As a result, in the case where the clusters corresponding to the recording request are reproduced, the data stored in the number (which is one plus the value stored in the consecutive cluster number information 516) of clusters is read out from the cluster of the physical sector number stored as the alternative destination position information 515, so that the newly recorded data is reproduced, and therefore, it can be made to look as if the data is overwritten.

Figure 5B:
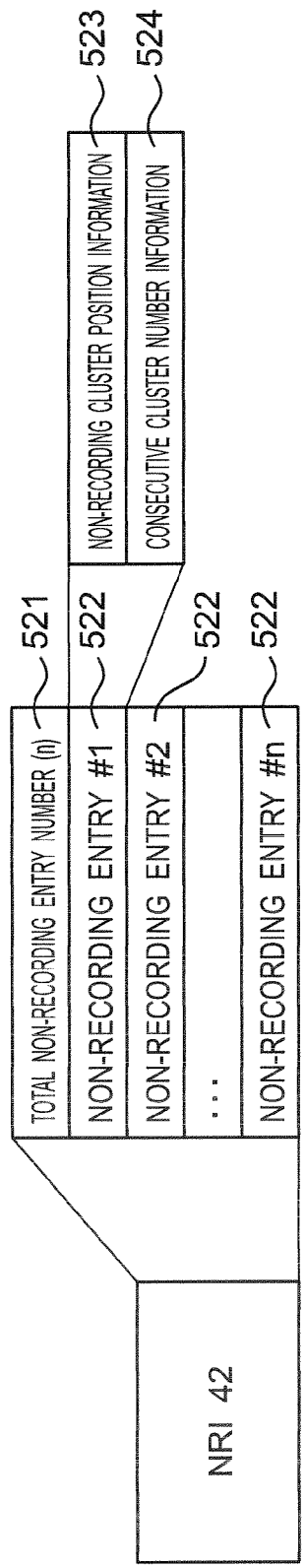
FIG. 5B is a format diagram of a data structure of an NRI 42 of FIG. 4.

FIG. 5B is a diagram of a data structure of the NRI 42 of FIG. 4. Referring to FIG. 5B, the NRI 42 is management information for managing a non-recorded defective cluster in a completely non-recorded state or a partially non-recorded state due to a failure of recording or a non-recorded cluster left unused in the non-recorded state in the areas of the ISA 10, the OSA 12, and the DMA 21.

The NRI 42 includes non-recording entries 522 for managing non-recorded defective clusters and non-recorded clusters, and a total non-recording entry number 521 that is the number of the non-recording entries 522.

The NRI 42 has a total of the n (where n is an integer equal to or greater than zero) non-recording entries 522 from #1 to #n of the non-recording entries 522. In the case where neither a non-recorded defective cluster nor a non-recorded cluster exists, the NRI 42 has the total non-recording entry number 521 of zero and the non-recording entry 522 does not exist.

Each of the non-recording entries 522 is configured to include non-recording cluster position information 523 and consecutive cluster number information 524.

For the non-recording cluster position information 523, a first physical sector number of a non-recorded defective cluster or a non-recorded cluster is stored.

For the consecutive cluster number information 524, in the case where non-recorded defective clusters or non-recorded clusters are consecutive, information indicative of the consecutive cluster number is stored. Specifically, in the case where the clusters are not consecutive, zero is stored as the consecutive cluster number information 524. In the case where the clusters are consecutive, the value of the number of consecutive clusters−1 is stored as the consecutive cluster number information 524. For example, in the case where consecutive non-recorded defective clusters are five clusters, the value of four is stored.

FIG. 5C is a diagram of a data structure of the SRRI 43 of FIG. 4. Referring to FIG. 5C, the SRRI 43 includes recording zone entries 532 that are information on a recording zone referred to as an SRR, which is a recording range in which data is sequentially recorded, a total recording zone number 531 that is the number of the recording zone entries 532, and actual next recordable position information 535.

The SRRI 43 has a total of the number s (where s is an integer equal to or greater than one) of recording zone entries 532 from #1 to #s of the recording zone entries 532. In the case where the user does not set an SRR, namely, in the case where the user data areas 11 present in all the recording layers are used as one recording zone for recording, the SRRI 43 has the total recording zone number of one and the one recording zone entry 532 of #1.

Each of the recording zone entries 532 is configured to include recording-zone leading position information 533 and last recording position information 534.

For the recording-zone leading position information 533, a physical sector number of a leading sector of a cluster at the beginning of a recording zone is stored.

For the last recording position information 534, when recording is performed in the recording zone, a physical sector number of the last sector having recorded user data is stored. When recording is not performed in the recording zone, zero is stored.

The actual next recordable position information 535 is information indicative of an actual next recordable position of the user data area 11. In the user data area 11, data is recorded in order from the recording layer L0, which is the recording layer on the deepest side from the surface of the optical disc 1, so as to avoid an influence of the transmittance change due to a recording state of another recording layer. Therefore, an actual next recordable position is different from the next recordable position in the recording zone of the SRRI 43. Thus, the information for managing the actual next recordable position is the actual next recordable position information 535.

Figure 5D:
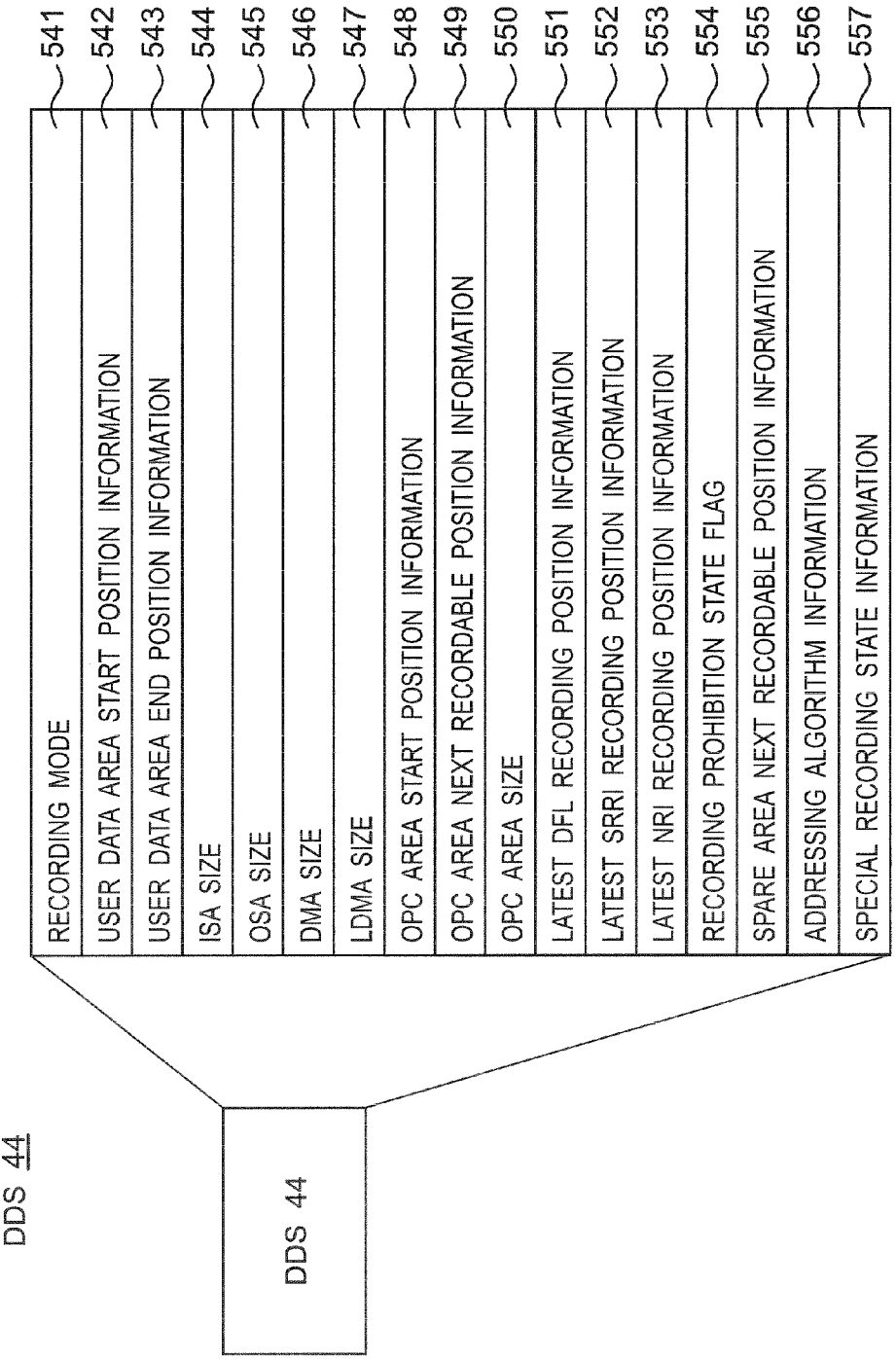
FIG. 5D is a format diagram of a data structure of a DDS 44 of FIG. 4.

FIG. 5D is a diagram of a data structure of the DDS 44 of FIG. 4. Referring to FIG. 5D, the DDS 44 is configured to include a recording mode 541, user data area start position information 542, user data area end position information 543, an ISA size 544, an OSA size 545, a DMA size 546, an LDMA size 547, OPC area start position information 548, OPC area next recordable position information 549, an OPC area size 550, latest DFL recording position information 551, latest SRRI recording position information 552, latest NRI recording position information 553, a recording prohibition state flag 554, spare area next recordable position information 555, addressing algorithm information 556, and special recording state information 557.

The recording mode 541 is information indicative of whether or not the optical disc 1 is in a logical overwriting recording mode or a sequential recording mode.

The user data area start position information 542 is information indicative of physical position information of the leading sector in the user data area 11. For the user data area start position information 542, the physical sector number of the leading sector in the user data area 11#0 of the recording layer L0 is stored.

The user data area end position information 543 is information indicative of logical position information of the last sector in the user data area 11. For the user data area end position information 543, the logical sector number of the last sector in the user data area 11#5 of the recording layer L2 is stored. Since the logical sector number starts from zero, the sector number, which is the logical sector number+1 and stored as the user data area end position information 543, is the size of the user data area 11 on the optical disc 1.

The ISA size 544 is information indicative of a size of the ISA 10 of the groove section or the land section of each of the recording layers.

The OSA size 545 is information indicative of a size of the OSA 12 of the groove section or the land section of each of the recording layers.

The DMA size 546 is information indicative of a size of the DMA 21 of the groove section or the land section of each of the recording layers.

Since the inner circumferential position of the DMA 21 is fixed, the arrangement position (inner circumferential side position) of the ISA 10 can be identified by using the information of the DMA size 546. Subsequently, by using the information of the ISA size 544, the leading sector of the user data area 11 can be identified in the recording layer L0 and the recording layer L2. Since the outer circumferential position of the data area 5 is fixed, the information of the OSA size 545 can be used for identifying not only the terminating sector of the user data area 11 in the recording layer L0 and the recording layer L2, but also the leading sector of the user data area 11 in the recording layer L1.

The LDMA size 547 is information indicative of a size of the LDMA 31 of each of the recording layers. The LDMA size 547 is always a value which is smaller than the DMA size 546.

The OPC area start position information 548 is information indicative of the start position of the OPC area 20. Although it is not shown, the DDS 44 stores six pieces of the OPC area start position information 548 indicative of the start position information of the OPC areas 20#0 to 20#5 of the groove sections and the land sections of the recording layers. For the OPC area start position information 548, for example, in the case of the OPC area 20#0, the physical sector number of the leading sector of the OPC area 20#0 is stored.

The OPC area next recordable position information 549 is information indicative of a next recordable position of the OPC area 20. Although not shown, the DDS 44 stores six pieces of the OPC area next recordable position information 549 indicative of the next recordable position information of the OPC areas 20#0 to 20#5 of the groove sections and the land sections of the recording layers. Since the OPC areas 20 are used in reverse order of the physical sector number, for example, in the case where the OPC area 20#0 is unused, the first physical sector number of the last cluster in the OPC area 20#0 is stored as the OPC area next recordable position information 549. In the case where predetermined test data is recorded as a test in the OPC area 20, this OPC area next recordable position information 549 is used for recording the test data from the position thereof for the test recording.

The OPC area size 550 is stored as size information of the OPC area 20. Although not shown, the DDS 44 stores six OPC area sizes 550 indicative of the size information of the OPC areas 20#0 to 20#5 of the groove sections and the land sections of the recording layers.

The latest DFL recording position information 551 is information indicative of a position, at which the latest DFL 41 of the DMS 40 is recorded. The latest DFL recording position information 551 stores the physical sector number of the leading sector in which the latest DFL 41 is recorded.

The latest SRRI recording position information 552 is information indicative of a position, at which the latest SRRI 43 of the DMS 40 is recorded. The latest SRRI recording position information 552 stores the physical sector number of the leading sector, in which the latest SRRI 43 is recorded.

The latest NRI recording position information 553 is information indicative of a position, at which the latest NRI 42 of the DMS 40 is recorded. The latest NRI recording position information 553 stores the physical sector number of the leading sector, in which the latest NRI 42 is recorded.

The recording prohibition state flag 554 is information indicative of whether or not the optical disc 1 is in a recording prohibition state. The recording prohibition state flag 554 includes a flag indicating that a prohibition state is implemented although recording can be performed in the user data area 11, and a flag indicating that the optical disc 1 including the lead-in area 4 etc. is in a completely non-recordable state since the optical disc 1 is finalized.

The spare area next recordable position information 555 is configured by next recordable position information of the ISAs 10#0 to 10#5, the OSAs 12#0 to 12#5 of the groove sections and the land sections of the recording layers. The spare area next recordable position information 555 indicates the next recordable positions of the spare areas. For example, when the ISA 10#0 is unused, the physical sector number of the leading sector of the ISA 10#0 is stored as the spare area next recordable position information 555. When data is recorded in the ISA 10 and the OSA 12, the corresponding spare area next recordable position information 555 is used for recording data from the position thereof.

The addressing algorithm information 556 is information indicative of what rules are followed when an area on the optical disc 1 is assigned to a logical sector number used for a recording and reproducing request from a user such as a higher-level apparatus (not shown).

The special recording state information 557 is information indicative of a recording method such as whether or not control is provided such that data is recorded in the user data areas 11 in the order from the recording layer L0 on the deepest side from the surface of the optical disc 1. In the present embodiment, the recording is always performed in order from the recording layer L0 in consideration of changes in transmittance and reflectance due to a difference in recording state. Therefore, the special recording state information 557 is set to 1 indicative of this fact.

(3) Configuration of Information Recording and Reproducing Apparatus

The description will be made of an optical disc drive that is an information recording and reproducing apparatus that records and reproduces data on the optical disc 1 according to the present embodiment.

Figure 6:
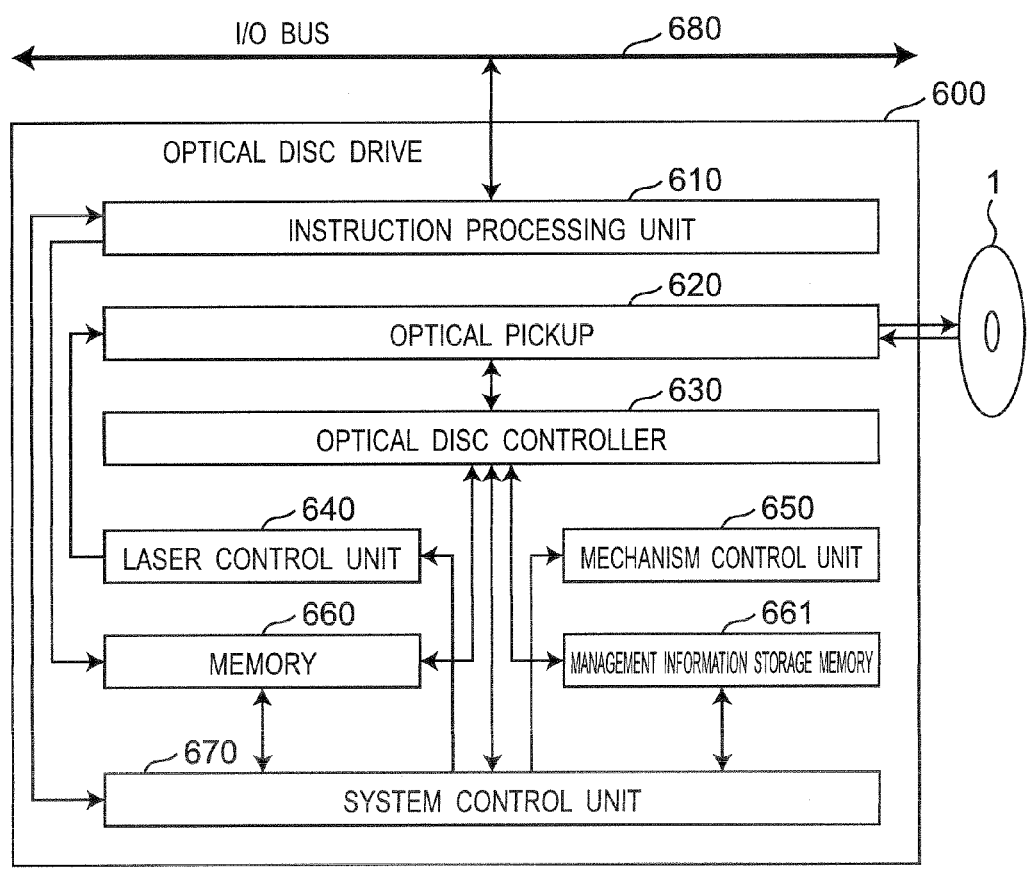
FIG. 6 is a block diagram of a configuration of an optical disc drive 600 recording and reproducing data on the optical disc 1 of FIG. 1.

FIG. 6 is a block diagram of an optical disc drive 600 that records and reproduces data on the optical disc 1 of FIG. 1. Referring to FIG. 6, the optical disc drive 600 is connected through an Input and Output bus (I/O bus) 680 to a higher-level apparatus (not shown). The higher-level apparatus is, for example, a host computer, a controller, etc.

Referring to FIG. 6, the optical disc drive 600 includes an instruction processing unit 610, an optical pickup 620, an optical disc controller 630, a laser control unit 640, a mechanism control unit 650, a memory 660, a management information storage memory 661, and a system control unit 670.

The instruction processing unit 610 processes various instructions requested in a form of a command etc. from the higher-level apparatus. The optical pickup 620 irradiates a laser beam to the optical disc 1 so as to record and reproduce data. The optical disc controller 630 controls the optical pickup 620 to record and reproduce various signals for the optical disc 1. The optical disc controller 630 stores data reproduced by the optical pickup 620 from the optical disc 1 into the memory 660. The optical disc controller 630 stores various pieces of information of the DMA 21 etc. reproduced by the optical pickup 620 from the optical disc 1 into the management information storage memory 661. The optical disc controller 630 reads data to be recorded on the optical disc 1 from the memory 660 and controls the optical pickup 620 to record the data on the optical disc 1. The optical disc controller 630 reads out management information to be recorded on the optical disc 1 from the management information storage memory 661, and then, controls the optical pickup 620 to record the information on the optical disc 1. The laser control unit 640 controls a laser power etc. output from the optical pickup 620. The mechanism control unit 650 moves the optical pickup 620 to an intended position to provide servo control. The memory 660 is used as a buffer temporarily storing data reproduced from the optical disc 1 by the optical disc controller 630 or data to be recorded on the optical disc 1 by the optical disc controller 630, and is used for temporarily storing various pieces of information required for the system control unit 670 to provide control, such as information related to various instructions requested from the higher-level apparatus. The management information storage memory 661 is used for storing the DFL 41, the NRI 42, the SRRI 43, and the DDS 44 that are the management information of the latest state read out from the DMA 21 by the optical disc controller 630 and is used for storing the management information to be recorded in the DMA 21 by the optical disc controller 630. The system control unit 670 controls the instruction processing unit 610, the optical disc controller 630, the laser control unit 640, and the mechanism control unit 650 based on various pieces of information stored in the memory 660 and the management information storage memory 661, and this leads to control of the overall system processes such as recording and reproducing processes for the optical disc 1 in an integrated manner.

(4) Recording Object Layer Determining Process

The process of determining the recording object layer will be described.

When the optical disc 1 is loaded into the optical disc drive 600, the system control unit 670 searches the DMAs 21 on the optical disc 1 to acquire the latest DMS 40. In the case where data is recorded in none of the DMAs 21, the system control unit 670 determines that the loaded optical disc 1 is a blank disc, and sets an initial value as the latest DMS 40. The initial value of a next recordable position of each area is the leading cluster of each area (the last cluster in the case of the OPC area) of the groove section of the recording layer L0.

The system control unit 670 obtains from the latest DMS 40, the next recordable positions of the OPC area 20, the ISA 10, the user data area 11, and the OSA 12. With regard to the next recordable position of the DMA 21, the cluster next to that having the latest DDS 44 recorded therein is the next recordable position of the DMA 21. The recording layer having these next recordable positions is defined as the recording object layer. In the case where the optical disc 1 is a blank disc, the recording object layer of the OPC area 20, the ISA 10, the OSA 12, the user data area 11, and the DMA 21 is set to the recording layer L0 on the deepest side from the surface of the optical disc 1.

(5) Data Recording Process

Figure 7:
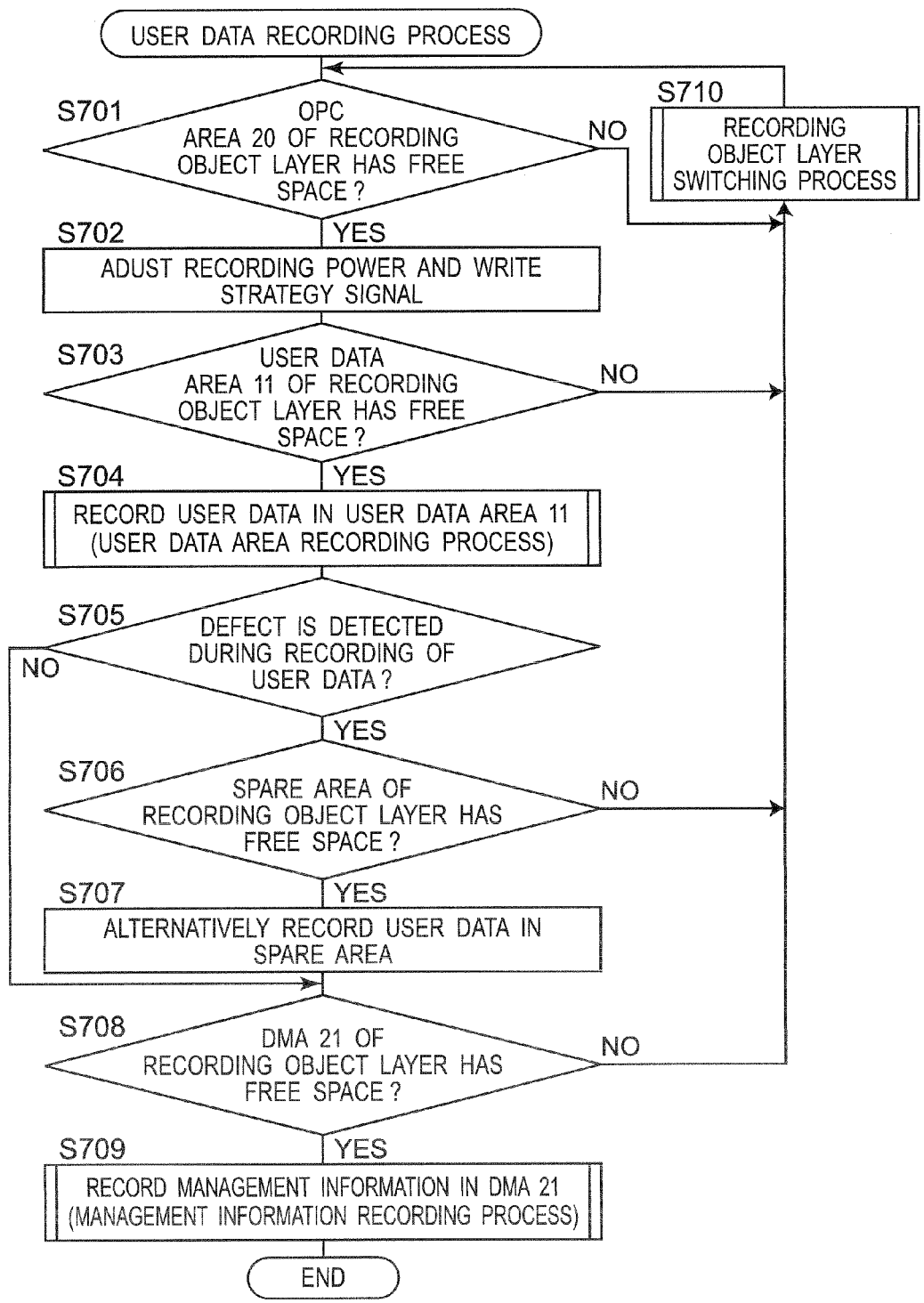
FIG. 7 is a flowchart of a user data recording process of recording user data on the optical disc 1 of FIG. 1, which is executed by a system control unit 670 of FIG. 6.

FIG. 7 is a flowchart of a user data area recording process of recording user data on the optical disc 1 of FIG. 1, which is executed by the system control unit 670 of FIG. 6. In this description, the system control unit 670 has already acquired from the latest DMS 40 the next recordable position information of the OPC area 20, the DMA 21, the ISA 10, the user data area 11, and the OSA 12.

At step S701 of FIG. 7, the system control unit 670 determines whether or not the OPC area 20 of the recording object layer has a free space required for recording. Specifically, the system control unit 670 calculates the free space of the OPC area 20 from a difference of the OPC area next recordable position information 549 and the OPC area start position information 548 of the recording object layer in the DDS 44. When it is determined that the free space of the OPC area 20 is equal to or greater than the size required for adjustment of the recording power and the write strategy signal (YES at step S701), the process flow goes to step S702.

When it is determined that the space of the OPC area 20 is insufficient (NO at S701), the process flow goes to step S710.

Subsequently, at step S702, the system control unit 670 instructs the laser control unit 640 to adjust the recording power and the write strategy signal. The instructed laser control unit 640 performs the test recording of predetermined test data for the OPC area 20 of the recording object layer to adjust the recording power and the write strategy signal.

Subsequently, at step S703, the system control unit 670 determines whether or not the user data area 11 of the recording object layer has a free space. Specifically, the free space of the user data area 11 of the corresponding recording object layer is calculated from the actual next recordable position information 535 in the SRRI 43, the user data area start position information 542, the size of the DMA 21, the size of the ISA 10, and the size of the OSA 12. For example, in the case of the recording layer L0, the end address of the user data area 11#1 of the land section of the recording layer L0 is obtained from the user data area start position information 542 and the size of the OSA 12. When the actual next recordable position information 535 is smaller than the obtained end address, it is determined that the user data area 11 of the corresponding recording object layer has the free space. When it is determined that the user data area 11 of the corresponding recording object layer has the free space (YES at step S703), the process flow goes to step S704. When the free space thereof is insufficient (NO at step S703), the process flow goes to step S710.

Subsequently, at step S704, the system control unit 670 records user data from the position indicated by the actual next recordable position information 535 to execute a user data area recording process of FIG. 8. In this user data area recording process, after the user data is recorded, the system control unit 670 stores the physical sector number of the cluster next to the recorded cluster as the actual next recordable position information 535 in the management information storage memory 661 to update the management information to the latest state.

Subsequently, at step S705, the system control unit 670 determines whether or not a defect is detected when the user data is recorded. Specifically, it is determined whether or not an error has occurred in the optical disc controller 630 when the user data is recorded. When an error has occurred, it is determined that a defect is detected. When no error has occurred, it is determined that a defect is not detected. When it is determined that a defect is detected (YES at step S705), the process flow goes to step S706. When it is determined that a defect is not detected (NO at step S705), the process flow goes to step S708.

Subsequently, at step S706, the system control unit 670 determines whether or not the ISA 10 and the OSA 12 of the recording object layer have a sufficient free space. Specifically, a spare area end address is calculated from the information of the DDS 44. Then, when the address of the spare area next recordable position information 555 is smaller than the calculated spare area end address, it is determined that the ISA 10 and the OSA 12 of the recording object layer have a sufficient free space. Otherwise, it is determined that the ISA 10 and the OSA 12 of the recording object layer are short of the free space. When it is determined that the ISA 10 and the OSA 12 of the recording object layer have a sufficient free space (YES at step S706), the process flow goes to step S707. When it is determined that the ISA 10 and the OSA 12 of the recording object layer are short of the free space (NO at step S706), the process flow goes to step S710.

Subsequently, at step S707, the system control unit 670 alternatively records into a spare area the user data supposed to be recorded in a cluster, in which a defect is detected. The system control unit 670 sets the alternative source position information 514 to the physical address of the cluster, in which a defect is detected. The system control unit 670 sets the alternative destination position information 515 to the physical address of the actually recorded spare area. The system control unit 670 sets the entry type information 513 to being non-recorded and adds the defect entry 512 to the DFL 41. After the user data is alternatively recorded in the spare area, the system control unit 670 stores the physical sector number of the cluster next to that having the user data recorded therein as the spare area next recordable position information 555 of the spare area used in the management information storage memory 661 for make an update to the latest state.

Subsequently, at step S708, the system control unit 670 determines whether or not the DMA 21 of the recording object layer has a sufficient free space. Specifically, when the end address of the LDMA 31 of the recording object layer is smaller based on the next recordable position information of the DMA 21 retained in the memory 660, it is determined that the DMA 21 of the recording object layer has a sufficient free space. Otherwise, it is determined that the DMA 21 of the recording object layer is short of a free space. When it is determined that the DMA 21 of the recording object layer has a sufficient free space (YES at S708), the process flow goes to step S709. When it is determined that the DMA 21 of the recording object layer is short of a free space (NO at S708), the process flow goes to step S710.

Subsequently, at step S709, since the SRRI 43 and the DFL 41 are updated, the system control unit 670 records into the DMA 21 the DMS 40 in the latest state retained in the management information storage memory 661 to execute a management information recording process of FIG. 10. In this management information recording process, after recording the management information, namely, the DMS 40, the system control unit 670 updates the next recordable position information of the DMA 21 retained in the memory 660 to the physical sector number of the cluster next to the recorded cluster.

Subsequently, at step S710, when any one of the OPC area 20, the user data area 11, the ISA 10, the OSA 12, and the DMA 21 runs short of a free space, the system control unit 670 executes a recording object layer switching process of switching the recording object layer of all the areas to the recording layer located to be closer to the surface of the optical disc 1 than the recording object layer, in which data has been already recorded. The details will be described later. After switching the recording object layer, the process flow goes to step S701, and data is recorded in the next recording layer.

As a result, the recording to all the areas (having different next recordable positions) for recording data can be limited to the same recording layer. Therefore, a recording layer to be closer to the incident light than the recording layer defined as the recording object is kept in the non-recorded state, and data can be recorded in all the areas without being affected by a transmittance change due to a recording state of another recording layer.

Additionally, since it is not necessary to shift a radial position so as to avoid an influence of transmittance, the areas can be arranged at the same radial positions. As a result, the limited areas can effectively utilized, and larger user data areas can be ensured as compared with the conventional techniques.

The OPC areas 20, which is conventionally difficult to implement as overlapping areas, can be overlapped.

Moreover, since data is recorded in the same recording layer, the optical pickup 620 does not perform inter-layer movement (layer jump). Since the time of several dozen milliseconds to several hundred milliseconds consumed for the layer jump during recording can be suppressed, and additionally, the need for a buffer retaining data during the time is eliminated, a buffer size can be made to be smaller, and the cost can be reduced.

In the present embodiment, the OPC areas 20 and the DMAs 21 are adjacently arranged under such a condition that a transmittance change in an area with the recording power adjusted does not affect the reproduction of the recording layer on the deeper side. This eliminates the need for an interval of approximately 200 μm between the OPC areas 20 and the DMAs 21, so that the areas can effectively be used.

Although the OPC areas 20 are arranged at the same radial position, the areas may at least partially overlap with each other in two or more recording layers.

Alternatively, the OPC areas 20 may be arranged without overlapping with each other in a radial direction. In this case, even if the OPC areas 20 run short of a free space, the recording object layer does not have to be shifted to the next recording layer.

Although the end address of the LDMA 31 is used for obtaining the free space of the DMA 21 at step S708, the end address of the TDMA 30 of the land section may be used. As a result, the latest DMS 40 is recorded in the TDMA 30 and the LDMA 31 so that the redundancy is improved.

A process of recording user data in the user data area 11 at step S704 will be described. FIG. 8 is a flowchart of the user data area recording process (S704) of recording user data in the user data area 11, which is a subroutine of FIG. 7. FIGS. 9A and 9B are format diagrams of a relationship of logical addresses (logical sector numbers) and physical addresses (physical sector numbers) at the time of user data recording.

The recording into the user data area 11 is performed by applying a technique of a pseudo overwrite process. The pseudo overwrite process has been executed for a recording request to an already recorded area. In the present disclosure, the same address translation is performed not only in this case but also to a recording request to an area discontinuous to an actual next recordable position in a non-recorded area so that data can be recorded at one actual next recordable position in order from the recording layer L0 of the optical disc 1.

Figure 8:
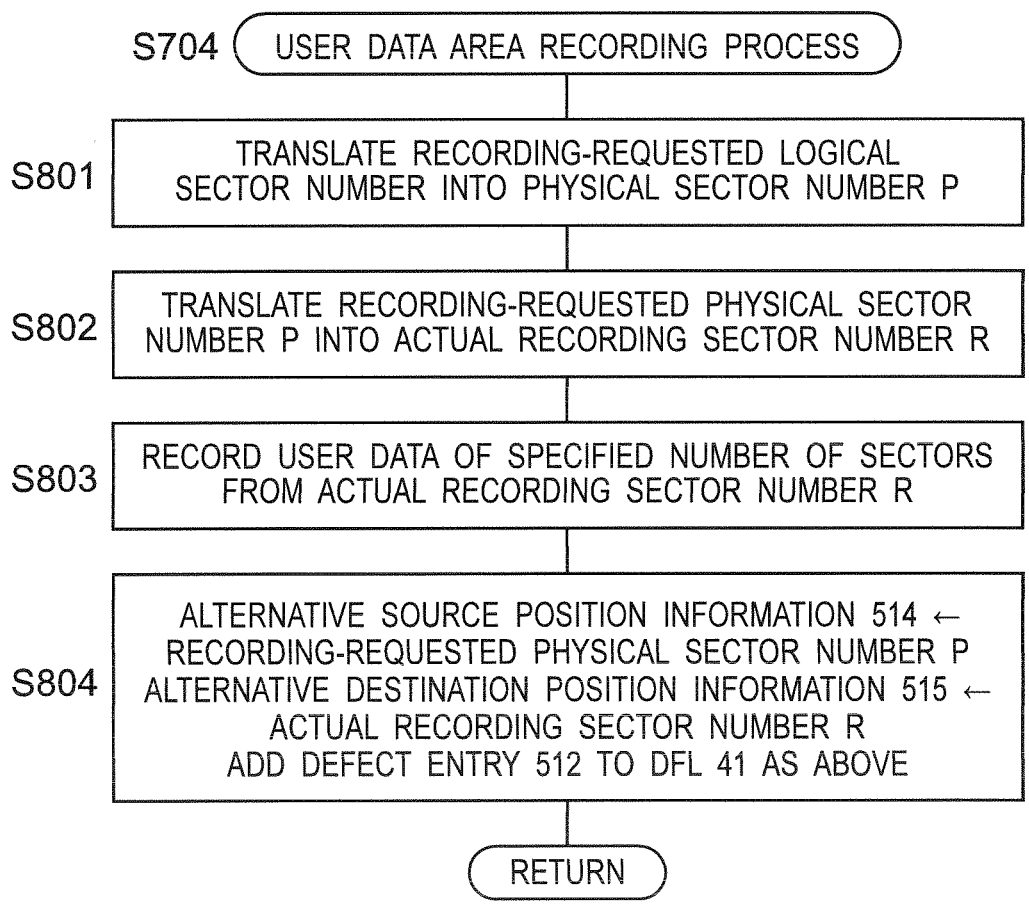
FIG. 8 is a flowchart of a user data area recording process (S704) of recording user data in a user data area, which is a subroutine of FIG. 7.
Figure 9A:
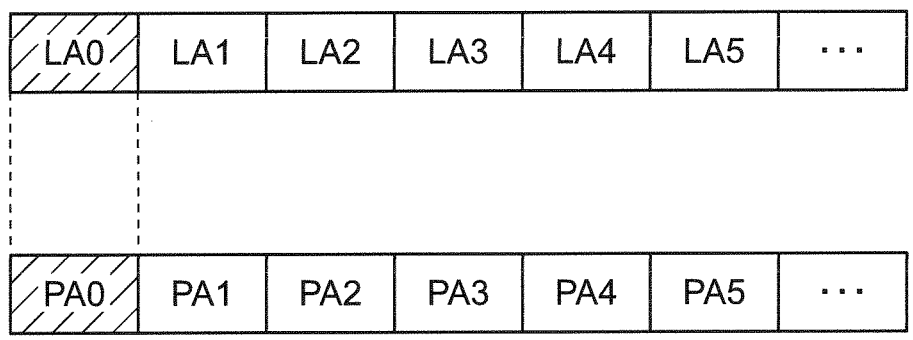
FIG. 9A is a format diagram of a relationship of logical addresses and physical addresses at the time of recording of user data in the user data area recording process of FIG. 8.
Figure 9B:
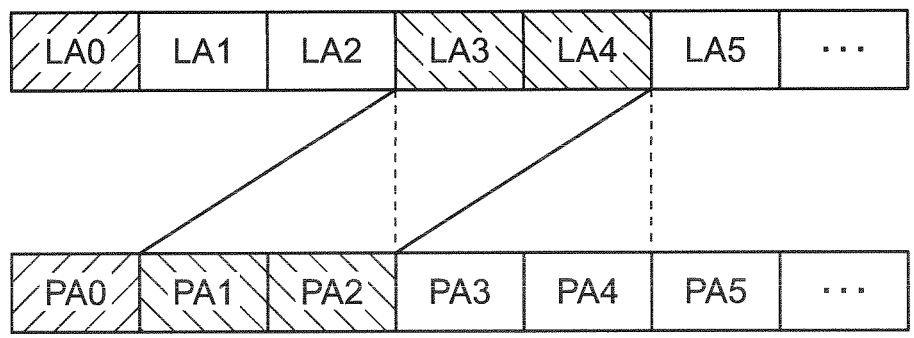
FIG. 9B is a format diagram of a relationship of logical addresses and physical addresses at the time of recording of user data in the user data area recording process of FIG. 8.

At step S801 of FIG. 8, when the optical disc drive 600 accepts from the higher-level apparatus (not shown) a recording command set in terms of the logical sector number of starting the recording and the number of sectors to be used for the recording, the instruction processing unit 610 translates the recording-requested logical sector number into a physical sector number P. This address translation is typical one-to-one logical-physical address translation. In the present embodiment, it is assumed that a logical sector number $LA_i$ is translated into a physical sector number $PA_i$ (where i is an integer equal to or greater than zero). For example, when the higher-level apparatus specifies LA0 for the logical sector number of starting the recording, the physical sector number is PA0. The physical sector number corresponding to a logical sector number LA3 is PA3.

Subsequently, at step S802, the system control unit 670 translates the physical sector number P into an actual recording sector number R that is a physical sector number at which data is actually recorded, such that the recording is performed from the recording layer on the deepest side from the surface of the optical disc 1. Specifically, the actual recording sector number R is the actual next recordable position information 535 in the SRRI 43. For example, referring to FIG. 9A, PA0 is stored as the actual next recordable position information 535 and the logical sector number LA0 is specified. In this case, the physical sector number P is PA0 and the corresponding actual recording sector number R is PA0. Referring to FIG. 9B, PA1 is stored as the actual next recordable position information 535 and the logical sector number LA3 is specified. In this case, the physical sector number P is PA3 and the corresponding actual recording sector number R is PA1.

Subsequently, at step S803, the system control unit 670 records the user data of the number of sectors specified by the higher-level apparatus, from the actual recording sector number R. After recording the user data, the system control unit 670 updates the value in the management information storage memory 661 such that the actual next recordable position information 535 in the SRRI 43 is set to the physical sector number of the cluster next to the recorded cluster. As a result, the latest next recordable position of the user data area 11 is managed.

Subsequently, a step S804, the system control unit 670 sets the physical sector number P as the alternative source position information 514, sets the actual recording sector number R as the alternative destination position information 515, and adds the defect entry 512 to the DFL 41. In this case, nothing is set as the entry type information 513 since the alternative source cluster is not non-recorded.

It is noted that, when the physical sector number P is identical to the actual recording sector number R, the logical sector number LAi is translated to the physical sector number PAi, and then, it is possible to determine the actual recording sector number R. Therefore, it is not necessary to add the defect entry 512.

As a result of the above process, the recording is started from the user data area 11 of the recording layer L0, which is the recording layer on the deepest side from the surface of the optical disc 1. As a result, a recording layer on the deeper side is first put into a recorded state. In particular, the recording is not performed in a recording layer to be closer to the incident light, and therefore, the recording can be performed without an influence of transmittance change due to a recording state of another recording layer. Since the optical disc drive 600 performs the address translation, data can be recorded without placing a limitation of the recording position on the higher-level apparatus.

The process of recording the latest management information into the DMA 21 at step S709 of FIG. 7 will be described. FIG. 10 is a flowchart of the management information recording process (S709) of recording the latest information into the DMA 21 of FIG. 2, which is a subroutine of FIG. 7. Hereinafter, among the TDMAs 30, the TDMA 30 including the next recordable position indicated by the next recordable position information of the DMA 21 and usable for the next recording will be referred to as a "next recording TDMA 30."

At step S1001 of FIG. 10, the system control unit 670 calculates the number M (where M is an integer equal to or greater than one) of clusters of the management information updated and required to be recorded. For example, it is assumed that when the user data is recorded, a defective cluster is detected and that the alternative recording is performed into the ISA 10 or the OSA 12. In this case, when the SRRI 43 and the DFL 41 are updated. When the size of the DFL 41 after the update is 1 cluster and 30 sectors (62 sectors) and the SRRI 43 is 2 sectors, then a total of 65 sectors including an additional 1 sector of the DDS 44 must be recorded. Therefore, the number of clusters of the management information required to be recorded is calculated as 3 clusters. The management information having no updated contents without the need of recording (in this case, the NRI 42 etc.) may be recorded together. For example, when the NRI 42 has the size of 1 sector and is added to the DFL 41, the SRRI 43, and the DDS 44 requiring update, the size is 3 clusters and the number of clusters used for the recording does not change. In such a case, for example, the non-updated management information is also recorded from the viewpoint of improvement in redundancy. Alternatively, when the DFL 41 has 2 clusters and 3 sectors (67 sectors) and the defect entry 512 is added to the last defect entry position (as the defect entry #d) of the DFL 41, the updated contents of the DFL 41 are only two clusters, which are the leading cluster having the total defect entry number and the third cluster having the defect entry #d. In such a case, the number of sectors of the DFL 41 requiring update is 32 sectors of the leading cluster and 3 sectors of the third cluster, and the number of clusters requiring update may be set to two clusters including the DDS 44. As a result, since the consumption of the DMA 21 can be suppressed and the area size of the DMA 21 can therefore be made to be smaller than that in the case of updating the whole of the DFL 41, larger user data areas can be assigned as compared with the conventional techniques.

Subsequently, at step S1002, the system control unit 670 calculates the number N (where N is an integer equal to or greater than zero) of remaining clusters usable for continuous recording in the next recording TDMA 30. Specifically, the number of clusters usable for recording is calculated from the position of the next recording TDMA 30 and the size of the DMA 21 or the size of the LDMA 31. For example, when the next recording TDMA 30 is the TDMA 30#0 of the groove section of the recording layer L0, the area of clusters usable for continuous recording is the area from the next recordable position, at which data is recorded next to the cluster at the termination position of the TDMA 30#0 (namely, immediately before the ISA 10#0).

Subsequently, at step S1003, the system control unit 670 determines whether or not all the management information to be recorded can be recorded in the next recording TDMA 30. Specifically, by using the number M of the clusters of the management information required to be recorded calculated at step S1001 and the number N of the clusters usable for continuous recording in the next recording TDMA 30 calculated at step S1002, it is determined whether or not N is equal to or larger than M. When N is equal to or larger than M (YES at step S1003), it is determined that all the management information can be recorded in the next recording TDMA 30, and then, the process flow goes to step S1004. When N is smaller than M (NO at step S1003), the information cannot be recorded in the next recording TDMA 30 only (the information must be recorded also in the different TDMA 30 or the LDMA 31). In this case, the process flow goes to step S1005.

Subsequently, at step S1004, the system control unit 670 records the latest management information in the next recording TDMA 30. Specifically, the system control unit 670 controls the optical pickup 620 through the optical disc controller 630 to record the management information in the latest state stored in the management information storage memory 661 for M clusters from the next recordable position of the next recording TDMA 30 (which is the position indicated by the next recordable position information of the DMA 21).

Subsequently, at step S1005, the system control unit 670 determines whether or not the next recording TDMA 30 is the TDMA 30 of the groove section. Specifically, this is determined from the physical sector number of the next recordable position of the next recording TDMA 30. When the next recording TDMA 30 is the TDMA 30#0, or the TDMA 30#2, or TDMA 30#4 (YES at step S1005), it is determined that the next recording TDMA 30 is the groove section, and then, the process flow goes to step S1006. Otherwise (NO at step S1005), it is determined that the area is the land section, and then, the process flow goes to step S1008.

Subsequently, at step S1006, the system control unit 670 records the management information as much as recordable in the next recording TDMA 30 of the groove section, or performs registration as an unused cluster to the NRI 42. For example, when the number M of the clusters of the management information required to be recorded is three and the number N of the clusters usable for recording is two, two clusters of the DFL 41 and the DDS 44 are recorded in the next recording TDMA 30. Alternatively, the next recordable position of the next recording TDMA 30 is added as the non-recording cluster position information 523, and the number of remaining recordable clusters is added as the consecutive cluster number information 524, to the NRI 42 stored in the management information storage memory 661. In the case of registering to the NRI 42, the management information is not used, and therefore, it looks as if an area is wasted; however, the latest management information, namely, the DMA 21, is located together in the next TDMA 30, and therefore, the time required to acquiring the latest management information can be reduced. Thus, the startup time of the optical disc 1 can be reduced.

Subsequently, at step S1007, the system control unit 670 records the latest management information in the TDMA 30 of the land section in the same recording layer as the next recording TDMA 30. Specifically, the DMS 40 configured by the remaining management information not recorded at step S1006 is recorded from the leading cluster of the TDMA 30 of the land section. For example, when the next recording TDMA 30 is the TDMA 30#0, data is recorded from the leading cluster of the TDMA 30#1 in the same recording layer.

Subsequently, at step S1008, the system control unit 670 records the management information as much as recordable in the next recording TDMA 30 of the land section, or performs registration as an unused cluster to the NRI 42. Specifically, this is the same process as step S1006 and will not be described in detail.

Subsequently, at step S1009, the system control unit 670 records the latest management information in the LDMA 31. Specifically, the system control unit 670 records all the latest management information in the recording layer into the LDMA 31 in the same recording layer as the next recording TDMA 30. All the management information including the management information not updated is recorded at this step. Specifically, the system control unit 670 records the DMS 40 configured by all the management information including the remaining management information not recorded at step S1008 into the LDMA 31.

Figure 11:
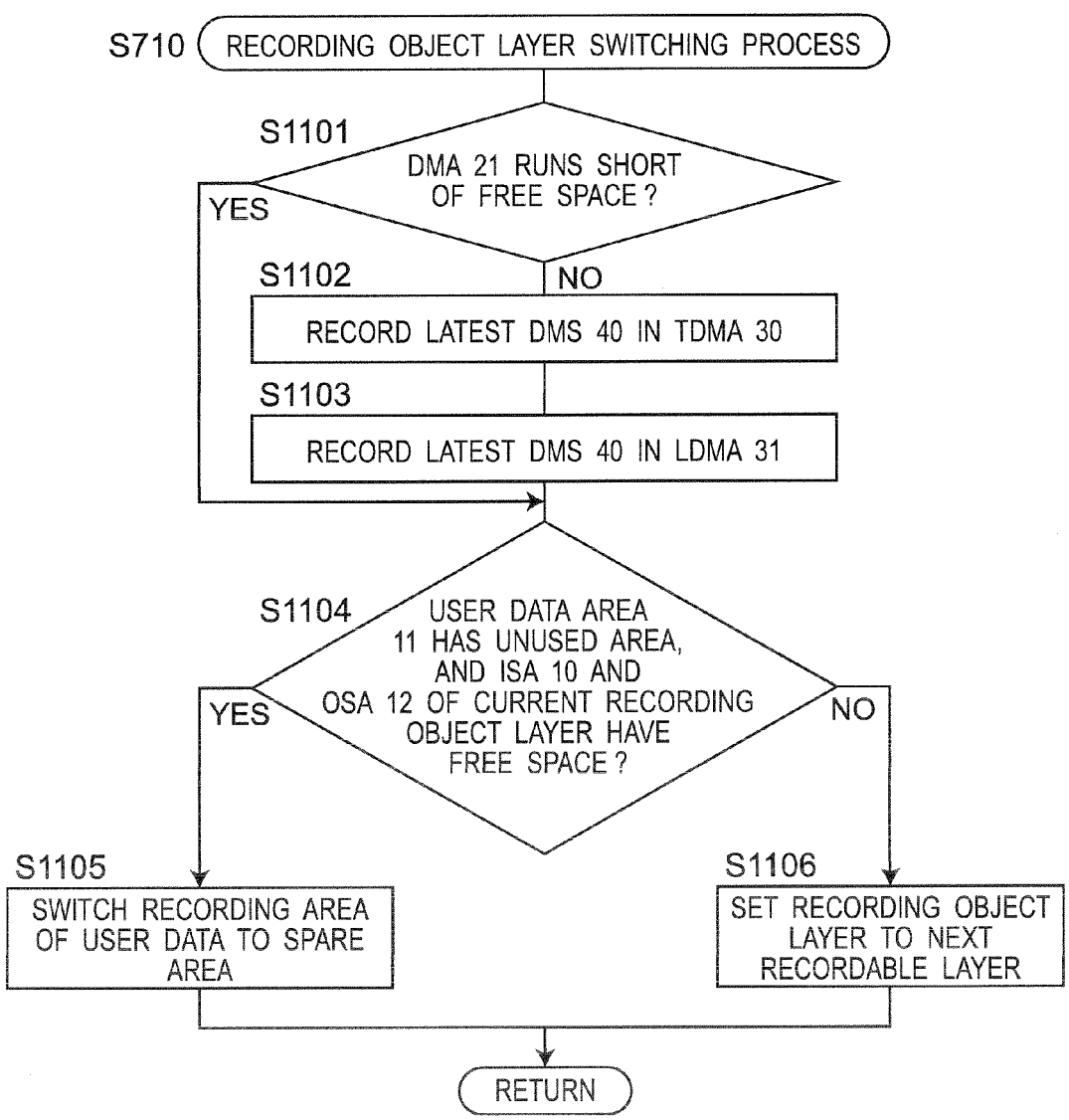
FIG. 11 is a flowchart of a process procedure of a recording object layer switching process (S710), which is a subroutine of FIG. 7.

The recording object layer switching process at step S710 will be described. FIG. 11 is a flowchart of a process procedure of the recording object layer switching process (S710), which is a subroutine of FIG. 7.

At step S1101 of FIG. 11, the system control unit 670 determines whether or not the area running short of the free space is the DMA 21. When an area other than the DMA 21 runs short of the free space (NO at step S1101), the process flow goes to step S1102. When the DMA 21 runs short of the free space (YES at step S1101), the process flow goes to step S1104. This is because, when the area running short of the free space is the DMA 21, subsequent steps S1102 and S1103 are skipped since the LDMA 31 has been already recorded.

Subsequently, at step S1102, the system control unit 670 records the latest DMS 40 in the TDMA 30 of the current recording object layer. The specific recording process procedure is shown in the flowchart of FIG. 10, and therefore, will not be described in detail. Although only the management information updated and required to be recorded is recorded at the time of recording in the TDMA 30 of FIG. 10, all the latest management information may be recorded including non-updated management information as long as the information can be recorded in the next recording TDMA 30. As a result, all the latest management information of the DMS 40 is recorded together near the non-recorded boundary of the TDMA 30, the management information can be read out in a reduced time.

Subsequently, at step S1103, the system control unit 670 records the latest DMS 40 in the LDMA 31 of the current recording object layer. The specific recording process procedure is the same as step S1009, and therefore, will not be described in detail. As a result, the DMA 21 indicates the completion of use of the current recording object layer.

Subsequently, at step S1104, the system control unit 670 determines whether or not the area for recording the user data is switched over to a spare area of the current recording object layer. Specifically, it is determined whether or not the recording object layer has ever been switched over because of running short of the free space in any of the OPC area 20, the ISA 10, the OSA 12, and the DMA 21, and whether or not the area running short of the free space in the current recording object layer is other than the spare area. In particular, when the recording object layer has ever been switched over because of running short of the free space of the area other than the user data area 11, this means that the user data area 11 has an unused area. Additionally, when the area running short of the free space in the current recording object layer is other than the spare area, this means that the spare area of the current recording object layer has a free space. Therefore, when the user data area 11 has an unused area and the ISA 10 and the OSA 12 of the current recording object layer have a free space, it is determined that the area is switched over to the spare area (YES at S1104), and then, the process flow goes to step S1105. When the user data area 11 has no unused area, or when the ISA 10 and the OSA 12 of the current recording object layer have no free space, it is determined that the area is not switched over to the spare area (NO at S1104), and then, the process flow goes to step S1106.

Subsequently, at step S1105, the system control unit 670 switches the area for recording the user data from the user data area 11 to the ISA 10 or the OSA 12. Specifically, the system control unit 670 sets and retains a spare area switching flag in the memory 660. Although the actual next recordable position information 535 in the SRRI 43 is used at step S802 when the actual recording sector number R is obtained, when the spare area switching flag is set, the actual recording sector number R is obtained by using the corresponding spare area next recordable position information 555 in the DDS 44. As a result, the actual recording sector number R is the next recordable position of the corresponding spare area, and the user data is alternatively recorded in the ISA 10 or the OSA 12. By alternatively recording the user data in the ISA 10 or the OSA 12, the data corresponding to a disused amount of the user data area 11 is recorded in the ISA 10 and the OSA 12, and therefore, this can prevent such a situation that the data cannot be recorded even though the user data area has a free space from the viewpoint of the higher-level apparatus. Since the user data capacity of the optical disc 1 is decided at the time of formatting before start of recording, the user data is alternatively recorded in the ISA 10 and the OSA 12 such that the maximum value of the size of the user data at the time of alternatively recording the user data into the ISA 10 and the OSA 12 becomes equal to the unused area size (free space) of the user data.

Subsequently, at step S1106, the system control unit 670 sets the recording object layer of the all the areas to a next recordable layer located to be closer to the surface of the optical disc 1 than the current object recording layer. Specifically, the next recordable position information of the DMA 21 retained in the memory 660 is set to the physical sector number of the leading cluster of the TDMA 30 of the groove section of the new recording object layer. The actual next recordable position information 535 in the SRRI 43 is set to the physical sector number of the leading cluster of the user data area 11 of the groove section of the new recording object layer. For the next recordable position information of the other areas, the next recordable position information has been already set, and the data is recorded in the new recording object layer with reference to the next recordable position information in accordance with the recording layer used for the recording.

Figure 12:
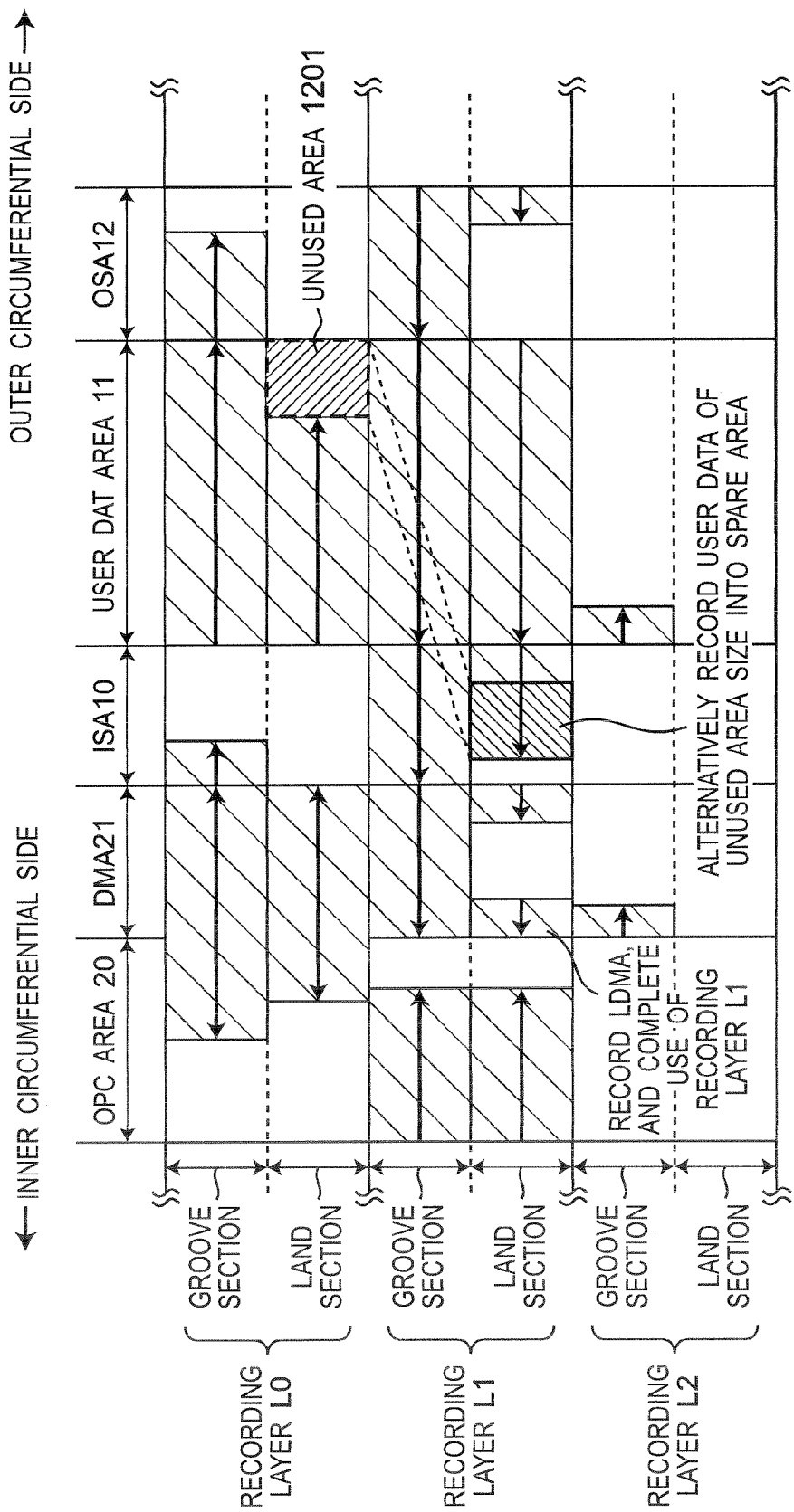
FIG. 12 is a format diagram of a recording state of the optical disc 1 of FIG. 1.

FIG. 12 is a format diagram of a recording state of the optical disc 1 of FIG. 1. For example, grey portions of FIG. 12 indicate recorded areas and arrows indicate recording directions. In the case of FIG. 12, since the DMA 21 runs short of the free space in the recording layer L0, the recording object layer switching process is executed. As a result, the recording object layer is set to the recording layer L1, and data are recorded in the recording layer L1 for all the areas.

Subsequently, since the user data area 11 of the recording layer L1 runs short of a free space, the recording object layer switching process is executed. In this case, the user data area 11 of the recording layer L0 has an unused area 1201 and the ISA 10 of the recording layer L1 has a free space. Therefore, the user data having the same size as the unused area 1201 is recorded in the ISA 10#3 of the recording layer L1 (which is the ISA 10 of the land section of the recording layer L1). It is noted that, although the size used for the recording is the same as the size of the unused area 1201, the data to be recorded is not the data supposed to be recorded in the unused area 1201.

After the data corresponding to the size of the unused area 1201 is recorded in the ISA 10 of the recording layer L1, the recording object layer is then set to the recording layer L2 to record data into the recording layer L2.

In this description, the data corresponding to the size of the unused area 1201 of the user data area 11 is recorded in the ISA 10#3 of the recording layer L1. This is because, since the spare area closest to the termination position of the user data area 11#3 is the ISA 10#3, a seek time for recording the user data can be shortened. Therefore, the time required for the recording can be shortened. Although the data corresponding to the unused area 1201 can be recorded in only the ISA 10, when the space is insufficient for the size of the unused area 1201 even after the user data is recorded into the ISA 10, the user data is recorded into a free area of the OSA 12#3 of the recording layer L1. When the recording area is still insufficient, the user data is recorded in the whole of the user data area 11 of the recording layer L2, and when the ISA 10 and the OSA 12 of the recording layer L2 have a free space, then the user data is recorded also in the ISA 10 and the OSA 12 of the recording layer L2 to reduce the size of the unused area in the user data area as far as possible. The data is alternatively recorded in the ISA 10 or the OSA 12 because, when the user data area 11 of a certain recording layer is used up, a failure is no longer detected in the recording layer so that the ISA 10 and the OSA 12 turns into disused areas. However, the DMA 21 must have a free area since the DFL 41 must be updated when it is attempted to alternatively record the user data in another area. Additionally, the OPC area 20 must be made available since an adjustment may be required for alternatively recording the user data in another area or for recording in the DMA 21. Therefore, the areas can most efficiently be used by recording the user data corresponding to the unused area into the ISA 10 or the OSA 12.

Referring to FIG. 12, the user data area 11 has no unused area in the recording layer L1. However, for example, when the DMA 21 runs short of the free space also in the recording layer L1, an unused area is generated in the user data area 11 of the recording layer L1. Therefore, the maximum value of the data size at the time of alternative recording of data into the ISA 10 and the OSA 12 is the size acquired by adding the unused area size of the recording layer L0 and the unused area size of the recording layer L1. Thus, the maximum value at the time of storing the user data is the size acquired by adding the unused area sizes of the user data areas 11 in the recording layers on the deeper side than the recording object layer, in which data is alternatively recorded in the ISA 10 and the OSA 12 (on the deeper side than the surface of the optical disc 1).

In addition, in this case, the user data is alternatively recorded to the ISA 10 and the OSA 12 so that the maximum value of the size of the user data when alternatively recording the user data to the ISA10 and OSA12. Thereafter, the recording target layer is set in the recording layer L2, and data is recorded to the recording layer L2. This is because of the following reasons. It is a high possibility that the physical sector number P is identical to the actual recording sector number R when recording data in the user data area 11 of the recording layer L2. Further, at step 804, when the physical sector number P is identical to the actual recording sector number R and any defect entry 512 is not added, then it may be possible to use the DMA21 of the recording layer L2, more efficiently.

The information recording method and the information recording apparatus according to the present disclosure is applicable to an optical disc drive apparatus etc. capable of recording and reproducing a write-once optical disc that has an information recording surface, in which information can optically be recorded on each of a land and a groove defined as recording tracks, and that enables recording from an arbitrary location.

What is claimed is:

1. An information recording method of recording information in an information recording medium having a plurality of recording layers including a first recording layer and a second recording layer located to be closer to a surface of the information recording medium than the first recording layer, wherein each of the plurality of recording layers includes a user data area for recording user data, a spare area for alternatively recording data of failed recording into the user data area, and a management information area for recording management information, wherein the first recording layer is used as a recording object layer at start of recording, and wherein, when any one of the user data area, the spare area, and the management information area of the first recording layer runs short of a free space, then the recording object layer of the user data area, the spare area, and the management information area is switched over to the second recording layer.

2. The information recording method as claimed in claim 1, wherein, when the recording object layer is switched over from the first recording layer to the second recording layer based on that the spare area or the management information area of the first recording layer runs short of a free space, and when the user data area runs short of a free space from among the user data area, the spare area, and the management information area of the second recording layer, then the user data is alternatively recorded in the spare area of the second recording layer.

3. The information recording method as claimed in claim 2, wherein the user data is alternatively recorded into the spare area of the second recording layer such that a maximum value of a size of the user data when alternatively recording the user data into the spare area of the second recording layer is set to a free space of the user data area of the first recording layer.

4. The information recording method as claimed in claim 1, wherein the plurality of recording layers further includes OPC areas for performing test recording, respectively, wherein the OPC areas are arranged at positions where positions in a radial direction overlap on each other in the plurality of recording layers, and wherein, when any one of the user data area, the spare area, the management information area, and the OPC area of the first recording layer runs short of a free space, then the recording object layer of the user data area, the spare area, the management information area, and the OPC area is switched over to the second recording layer located to be closer to the surface of the information recording medium than the first recording layer.

5. An information recording apparatus recording information in an information recording medium having a plurality of recording layers including a first recording layer and a second recording layer located to be closer to a surface of the information recording medium than the first recording layer, wherein each of the plurality of recording layers includes a user data area for recording user data, a spare area for alternatively recording data of failed recording into the user data area, and a management information area for recording management information, wherein the information recording apparatus comprises a recording control unit that starts recording by using the first recording layer as a recording object layer among from the plurality of recording layers of the information recording medium, and wherein, when any one of the user data area, the spare area, and the management information area of the first recording layer runs short of a free space, then the recording control unit switches the recording object layer of the user data area, the spare area, and the management information area to the second recording layer.

6. The information recording apparatus as claimed in claim 5, wherein, when the recording object layer is switched over from the first recording layer to the second recording layer based on that the spare area or the management information area of the first recording layer runs short of a free space, and when the user data area runs short of a free space among the user data area, the spare area, and the management information area of the second recording layer, then the recording control unit alternatively records the user data in the spare area of the second recording layer.

7. The information recording apparatus as claimed in claim 6, wherein the recording control unit alternatively records the user data into the spare area of the second recording layer such that a maximum value of a size of the user data when alternatively recording the user data into the spare area of the second recording layer is set to a free space of the user data area of the first recording layer.

8. The information recording apparatus as claimed in claim 5, wherein the plurality of recording layers further includes OPC areas for performing test recording, respectively, wherein the OPC areas are arranged at positions where positions in a radial direction of the information recording medium overlap with each other in the plurality of recording layers, and wherein, when any one of the user data area, the spare area, the management information area, and the OPC area of the first recording layer runs short of a free space, then the recording control unit switches the recording object layer of the user data area, the spare area, the management information area, and the OPC area to the second recording layer located to be closer to the surface of the information recording medium than the first recording layer.

* * * * *